(12) United States Patent
Nzeadibe et al.

(10) Patent No.: US 12,735,625 B2
(45) Date of Patent: Sep. 15, 2026

(54) DISSOLUTION OF MANGANESE OXIDES IN A WELLBORE

(71) Applicant: Halliburton Energy Services, Inc., Houston, TX (US)

(72) Inventors: Kingsley Nzeadibe, Houston, TX (US); Hui Zhou, Houston, TX (US); Emily Hart, Houston, TX (US); Dorianne Arlene Castillo, Houston, TX (US); Pramod Kumar Goswami, Pune (IN); Harshada Thakar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/897,740

(22) Filed: Sep. 26, 2024

(65) Prior Publication Data

US 2026/0085230 A1 Mar. 26, 2026

(51) Int. Cl.
*C09K 8/528* (2006.01)
*E21B 43/22* (2006.01)

(52) U.S. Cl.
CPC .................................... *C09K 8/528* (2013.01)

(58) Field of Classification Search
CPC ............ C09K 8/52; C09K 8/528; E21B 37/06
See application file for complete search history.

(56) References Cited

U.S. PATENT DOCUMENTS 5,385,827 A * 1/1995 Clark ........................ C22B 3/18 435/14
2014/0110121 A1 4/2014 Al Moajil et al.
2023/0264973 A1 8/2023 Vollmer et al.

FOREIGN PATENT DOCUMENTS

CA 3114822 A1 * 10/2021 ............... C09K 8/36
EP 2930163 A1 10/2015

OTHER PUBLICATIONS

Mabrouk, et al., "Ligand Exchange Method for Determination of Mole Ratios of Relatively Weak Metal Complexes: A Comparative Study," Chemistry Central Journal, vol. 12, Article 143, 2018.
Santawaja, et al., "Dissolution of Iron Oxides Highly Loaded in Oxalic Acid Aqueous Solution for a Potential Application in Iron-Making," ISIJ International, vol. 62, No. 12, 2022, pp. 2466-2475.
Osipov, et al., "A Study on the Interaction of Manganese Dioxide with Ammonium Chloride," AIP Conference Proceedings 2141, 020023, Aug. 28, 2019.
Peña, et al., "Dissolution of Hausmannite (Mn3O4) in the Presence of the Trihydroxamate Siderophore Desferrioxamine B," Geochimica et Cosmochimica Acta, vol. 71, Issue 23, Dec. 1, 2007, p. 5661.
Badr, et al., "Scalable, Inexpensive, One-Pot, Facile Synthesis of Crystalline Two-Dimensional Birnessite Flakes," Matter 5, Jul. 6, 2022, pp. 2365-2381.
Springer, et al., "Microbial Ligand Coordination: Consideration of Biological Significance," Coordination Chemistry Reviews, Science Direct, 2015.

(Continued)

*Primary Examiner* — Zakiya W Bates
(74) *Attorney, Agent, or Firm* — The Hilton Firm PLLC

(57) ABSTRACT

Treatment fluids and methods for dissolving manganese oxides in a wellbore. A treatment fluid includes an activator selected from the group consisting of hydroxylamine, isopropyl hydroxylamine, ethanolamine, amino alcohols, salts thereof, and combinations thereof; an acid and/or acid-generating agent; and an aqueous base fluid. The treatment fluid is introduced into a wellbore and contacts a manganese oxide in the wellbore to dissolve the manganese oxide.

7 Claims, 3 Drawing Sheets

(56) References Cited

OTHER PUBLICATIONS

Saal, et al., "Synergistic Dissolution of Manganese Oxides as Promoted by Siderophores and Small Oranic Acids," Soil Chemistry, Nov. 2010, vol. 74, No. 6, pp. 2021-2031.
Das, et al., "Studies on Reduction of Manganese Dioxide by (NH4)2 SO3 in Ammoniacal Medium," Hydrometallurgy, 1998, vol. 50, pp. 39-49.
Deng, et al., "Extraction of Iron and Manganese from Pyrolusite Absorpotion Residue by Ammonium Sulphate Roasting-Leaching Process", Metals, 2018, pp. 1-12.
Wen, et al., "Recovery of Pure MnSO4 By Crystallization After Separation of Fe(III) and Zn(II) from the Reductive Leaching Solution of Manganese Dust Containing Mn3O4," J. Min. Metall. Sect. B: Metallurgy, 59 (3), 2023, pp. 383-393.
Sinha, et al., "Reducing Agents in the Leaching of Manganese Ores: A Comprehensive Review," Hydrometallurgy, 187 (2019), pp. 168-186.
Toro, et al., "Leaching Manganese Nodules With Iron-Reducing Agents—A Critical Review," Minerals Engineering, 163 (2021), 106748, 13 pgs.
Al Mojil, "Removal of Filter Cake Generated by Manganese Tetraoxide Water-Based Drilling Fluids," Office of Graduate Studies of Texas A&M University, Master of Science, Aug. 2010, 73 pgs.

* cited by examiner

FIG. 3
FIG. 4
MSA
MSA
10% v/v Lactic
1.5g Micromax

MANGANESE TETROXIDE IN 10 PERCENT ACIDS AND 3 PERCENT ACTIVATOR (ISOPROPYL HYDROXYLAMINE). FROM LEFT TO RIGHT: ACID IS FORMIC ACID, METHANESULFONIC ACID, AND LACTIC ACID

MANGANESE TETROXIDE IN 10 PERCENT ACIDS. FROM LEFT TO RIGHT: ACID IS FORMIC ACID, LACTIC ACID, AND METHANESULFONIC

DISSOLUTION OF MANGANESE OXIDES IN A WELLBORE

TECHNICAL FIELD

The present disclosure relates generally to wellbore operations, and more particularly, to the use of a treatment fluid to dissolve manganese oxides within a wellbore.

BACKGROUND

Natural resources such as gas, oil, and water residing in a subterranean formation may be recovered from a wellbore. During the drilling phase of the wellbore's life, a drilling fluid is circulated in a wellbore to lubricate the drill bit and to suspend and carry the drill cuttings to the surface for removal from the wellbore. For deeper drilling operations, denser drilling fluids may be desirable. In some deeper drilling operations, the density of the drilling fluid may be increased with the use of weighting agents. The solid weighting agents may impact other fluid properties besides density. For example, higher concentrations of weighting agents may increase fluid viscosity beyond a point that is usable. As such, heavier weighting agents may be preferred because these heavier weighting agents may increase the fluid density to desirable levels with a lower concentration of weighting agent. These weighting agents may also form part of the wellbore filter cake and remain in the wellbore after the wellbore has been drilled.

To reestablish formation permeability, the filter cake and its component weighting agents should be removed. Removal of some weighting agents may prove difficult even with the use of large volumes of concentrated acids. If the heavier weighting agents are difficult to remove from the wellbore, their benefit on fluid rheology of the drilling fluid may be negated.

The cleanup of a filter cake is an important wellbore operation. The present disclosure provides improved treatment fluids for removing filter cake components such as manganese oxides.

BRIEF DESCRIPTION OF THE DRAWINGS

Illustrative examples of the present disclosure are described in detail below with reference to the attached drawing figures, which are incorporated by reference herein, and wherein.

Figure 1:
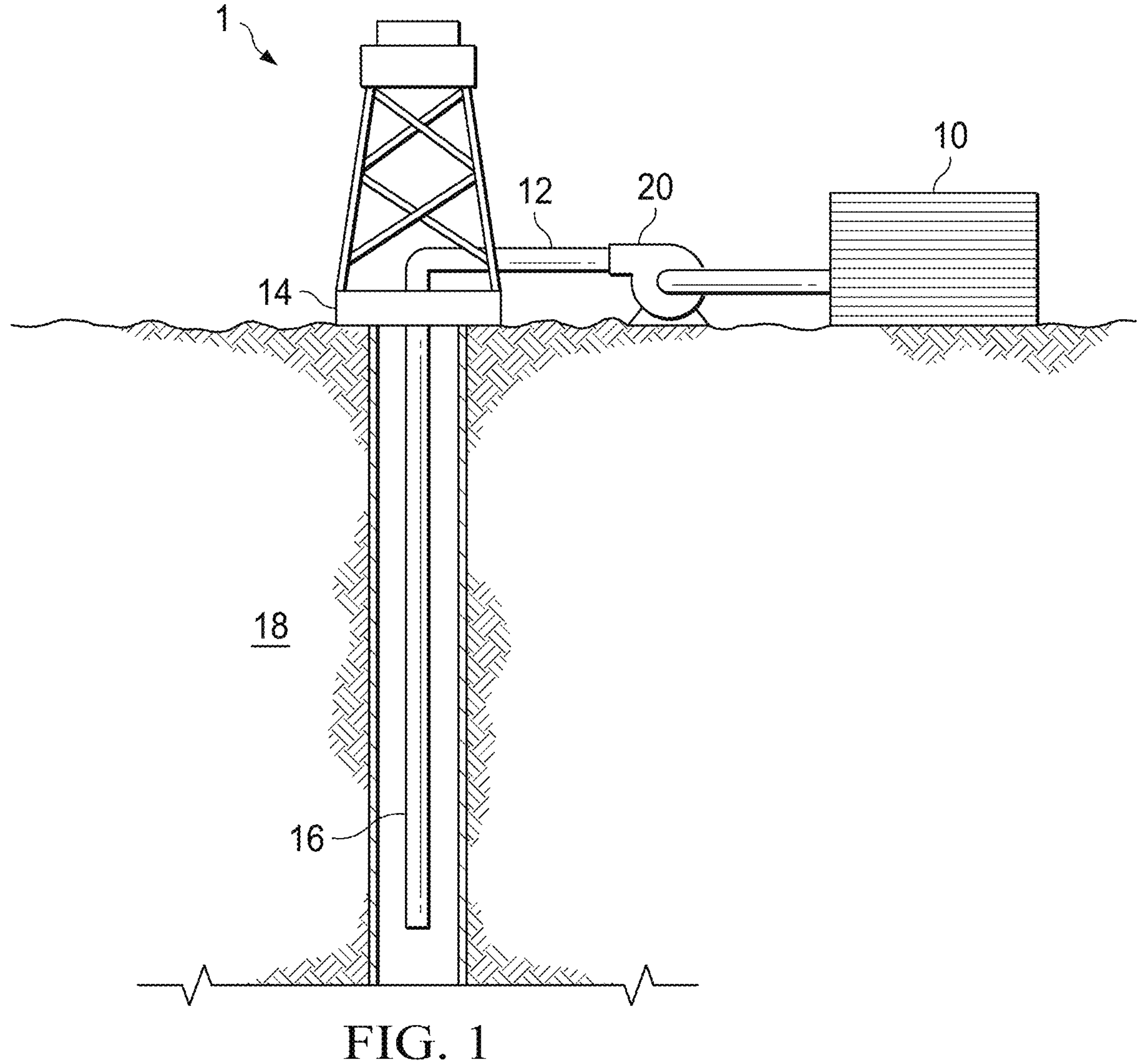
FIG. 1 is an illustrative schematic of a system that can deliver examples of the treatment fluids to a downhole location in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a treatment fluid to dissolve manganese oxides within a wellbore.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms "uphole" and "downhole" may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms "upstream" and "downstream" may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

As used herein the weight/volume ("w/v") is to be understood to mean the grams/milliliters and the weight/volume percentage ("% w/v") is to be understood to mean the grams/milliliters multiplied by 100.

The present disclosure relates generally to wellbore operations, and more particularly, to the use of a treatment fluid to dissolve manganese oxides within a wellbore. Advantageously, the treatment fluid comprises an activator that can dissolve manganese oxides in combination with weak and/or lower concentration acids. Moreover, this dissolution occurs without the generation of byproducts that will be insoluble in the treatment fluid. As a further advantage the acids used may be organic or inorganic acids. Moreover, an acid-generating agent may be used to introduce an acid into the system when the treatment fluid is downhole. As discussed, the acid may be relatively weaker in concentration or the acid species may be weaker than stronger acid species. Weaker and/or less concentrated acids may not corrode downhole equipment. The treatment fluid may also function without other agents, such as hydrazine and hydrazide. In some specific examples, the treatment fluid comprises the activator, the acid and/or acid-generating agent, and the aqueous base fluid and is also substantially free of hydrazine and/or hydrazide. The term "substantially free" refers to a concentration in the treatment fluid of less than 0.01% w/v. In some examples, the treatment fluid may consist of the activator, acid and/or acid-generating agent, and the aqueous base fluid. The treatment fluid may be used to clean up the wellbore after the completion of the drilling operation and may be used to remove manganese oxides that have been deposited in the wellbore. Yet another advantage is that the treatment fluid may remove manganese oxides from the filter cake on the wellbore walls and may assist in restoring formation permeability after the conclusion of the drilling operation. Additionally, the treatment fluid may be used with or without heating. As a further advantage, the treatment fluid may allow for the use of drilling fluids comprising manganese oxides with or without calcium carbonate. This may be of particular importance for deeper drilling operations requiring denser drilling fluids as the relatively heavier manganese oxides may be used at lower concentrations in order to achieve the desired fluid density.

The treatment fluids comprise an activator. The activator may be used in the treatment fluid to facilitate ion pairing which may lead to dissolution of manganese oxides in the wellbore. The activator is used in the presence of an acid and the dissolution of the manganese oxides may be performed with or without heating. If heat is added to the treatment fluid, the dissolution reaction may be accelerated in some examples. Examples of the activator may include, but are not limited to, hydroxylamine, isopropyl hydroxylamine, amino alcohols (e.g., ethanolamine, methanolamine, propanolamines, valinol, and the like) salts thereof, or any combination of activators.

The concentration of the activator in a treatment fluid may range from about 0.1% w/v to about 40% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the activator in the treatment fluid may range from about 0.1% (w/v) to about 40% (w/v), from about 0.5% (w/v) to about 40% (w/v), from about 1% (w/v) to about 40% (w/v), from about 2% (w/v) to about 40% (w/v), from about 3% (w/v) to about 40% (w/v), from about 4% (w/v) to about 40% (w/v), from about 5% (w/v) to about 40% (w/v), from about 6% (w/v) to about 40% (w/v), from about 7% (w/v) to about 40% (w/v), from about 8% (w/v) to about 40% (w/v), from about 9% (w/v) to about 40% (w/v), from about 10% (w/v) to about 40% (w/v), from about 15% (w/v) to about 40% (w/v), from about 20% (w/v) to about 40% (w/v), from about 25% (w/v) to about 40% (w/v), from about 30% (w/v) to about 40% (w/v), or from about 35% (w/v) to about 40% (w/v). As another example, the concentration of the activator in the treatment fluid may range from about 0.1% (w/v) to about 40% (w/v), 0.1% (w/v) to about 35% (w/v), 0.1% (w/v) to about 30% (w/v), 0.1% (w/v) to about 25% (w/v), 0.1% (w/v) to about 20% (w/v), 0.1% (w/v) to about 15% (w/v), 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select an activator having a desirable concentration for use in a given treatment fluid.

The treatment fluids described herein comprise an acid and/or an acid-generating agent. The acid may be used to assist in dissolution of the manganese oxides. Generally, the presence of the activator will allow for the use of an acid and/or acid-generating agent that is less corrosive or toxic than typical acids chosen for some wellbore operations. For example, the treatment fluid may not comprise hydrochloric acid.

The acid may be an organic acid or an inorganic acid. Examples of the acid may include, but are not limited to, formic acid, lactic acid, glycolic acid, hydroxy acids, methane sulfonic acids, citric acid, pyruvic acid, chloroacetic acid, haloacetic acids, methanesulfonic acid, sulfuric acid, ascorbic acid, salt of phosphonic and/or any combination thereof.

The acid-generating agent is used to generate an acid in the wellbore under downhole conditions. Examples of the acid-generating agent include, but are not limited to, esters, acid chlorides, orthoesters, formates, lactides, lactic acid derivatives, carbonates, amino acids, glycolides, ε-caprolactones, hydroxy ester ethers, hydroxybutyrates, anhydrides, phosphazenes, methyl lactate, ethyl lactate, propyl lactate, butyl lactate, formate esters (e.g., ethylene glycol monoformate, ethylene glycol diformate, diethylene glycol diformate, glyceryl monoformate, glyceryl diformate, glyceryl triformate, triethylene glycol diformate and formate esters of pentaerythritol), esters or polyesters of glycerol (e.g., tripropionin (a triester of propionic acid and glycerol), trilactin, etc.) esters of acetic acid and glycerol (e.g., monoacetin, diacetin, and triacetin), sulfonate esters (e.g., methyl p-toluenesulfonate, ethyl p-toluenesulfonate, methyl methanesulfonate, ethyl methanesulfonate, methyl benzenesulfonate, ethyl benzenesulfonate, methyl 2,4,6-trimethylbenzenesulfonate, ethyl 2,4,6-trimethylbenzenesulfonate), aliphatic polyesters, poly(lactides), poly(glycolides), poly(ε-caprolactones), poly(hydroxy ester ethers), poly(hydroxybutyrates), poly(anhydrides), aliphatic polycarbonates, poly (orthoesters), poly(amino acids), poly(ethylene oxides), polyphosphazenes, copolymers thereof, and/or any combination thereof.

The concentration of the acid and/or acid-generating agent in a treatment fluid may range from about 1% w/v to about 40% w/v. The concentration may range from any lower limit to any upper limit and encompass any subset between the upper and lower limits. Some of the lower limits listed may be greater than some of the listed upper limits.

One skilled in the art will recognize that the selected subset may require the selection of an upper limit in excess of the selected lower limit. Therefore, it is to be understood that every range of values is encompassed within the broader range of values. For example, the concentration of the acid and/or acid-generating agent in the treatment fluid may range from about 1% (w/v) to about 40% (w/v), from about 1.5% (w/v) to about 40% (w/v), from about 2% (w/v) to about 40% (w/v), from about 2.5% (w/v) to about 40% (w/v), from about 3% (w/v) to about 40% (w/v), from about 4% (w/v) to about 40% (w/v), from about 5% (w/v) to about 40% (w/v), from about 6% (w/v) to about 40% (w/v), from about 7% (w/v) to about 40% (w/v), from about 8% (w/v) to about 40% (w/v), from about 9% (w/v) to about 40% (w/v), from about 10% (w/v) to about 40% (w/v), from about 15% (w/v) to about 40% (w/v), from about 20% (w/v) to about 40% (w/v), from about 25% (w/v) to about 40% (w/v), from about 30% (w/v) to about 40% (w/v), or from about 35% (w/v) to about 40% (w/v). As another example, the concentration of the acid and/or acid-generating agent in the treatment fluid may range from about 1% (w/v) to about 40% (w/v), 1% (w/v) to about 35% (w/v), 1% (w/v) to about 30% (w/v), 1% (w/v) to about 25% (w/v), 1% (w/v) to about 20% (w/v), 1% (w/v) to about 15% (w/v), 1% (w/v) to about 10% (w/v), from about 1% (w/v) to about 9% (w/v), from about 1% (w/v) to about 8% (w/v), from about 1% (w/v) to about 7% (w/v), from about 1% (w/v) to about 6% (w/v), from about 1% (w/v) to about 5% (w/v), from about 1% (w/v) to about 4% (w/v), from about 1% (w/v) to about 3% (w/v), from about 1% (w/v) to about 2% (w/v), or from about 1.5% (w/v) to about 1% (w/v). With the benefit of this disclosure, one of ordinary skill in the art will be readily able to prepare and select an acid and/or acid-generating agent having a desirable concentration for use in a given treatment fluid.

The treatment fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous base fluid may be from any source provided that the aqueous base fluid does not contain an excess of compounds that may undesirably affect other components in the treatment fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, ammonium chloride brines, and the like. Suitable divalent brines can include, for example, zinc bromide brines, zinc chloride brines, manganese chloride brines, manganese bromide brines, calcium bromide brines, magnesium chloride brines, calcium chloride brines, and the like.

The concentration of the aqueous base fluid in the treatment fluid may range from about 1% (w/v) to about 99% (w/v). The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the treatment fluid may range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the treatment fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a treatment fluid having a sufficient concentration of an aqueous base fluid for a given application.

In some optional examples, the treatment fluids may further comprise an additional additive. The additional additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

The treatment fluid may be used to dissolve a variety of species of manganese oxides. Specific examples of manganese oxides that may be dissolved include, but are not limited to, manganese oxide, manganese dioxide, manganese tetroxide, or combinations of oxides.

In some optional examples, the treatment fluid functions without other agents, such as hydrazine, hydrazide, and the like, and may consist of the activator, acid and/or acid-generating agent, and the aqueous base fluid. In some optional examples, the treatment fluid may be substantially free of other agents, such as hydrazine, hydrazide, and the like. In some optional examples, the treatment fluid does not use strong acids such as hydrochloric acid. In examples where strong acids are used, these acids may be used at reduced concentrations relative to traditional filter cake clean-up fluids. In some examples, the treatment fluid may not comprise or may be substantially free of ethylenediaminetetraacetic acid.

The treatment fluids have a density suitable for a particular application. By way of example, the treatment fluids may have a density in a range of from about 8 pounds per gallon ("1b/gal") to about 20 lb/gal, in a range of from about 9 lb/gal to about 20 lb/gal, or in a range of from about 10 lb/gal to about 20 lb/gal. With the benefit of this disclosure, those of ordinary skill in the art will readily recognize the appropriate density of a treatment fluid for a particular application.

The treatment fluids may be used in wellbores and subterranean formations having a variety of temperatures. By way of example, the wellbores and subterranean formations may have a temperature in a range of about 65° F. to about 500° F. The treatment fluids may be used to dissolve manganese oxides in a variety of wellbores and under a variety of wellbore conditions.

An example use for the treatment fluid includes cleaning a wellbore through the dissolution of manganese oxides. The treatment fluid may be introduced after the completion of a drilling operation. In some examples, the drilling fluid may introduce manganese oxides into the wellbore as the manganese oxides may be added to the drilling fluid as weighting agents or may be in the brine base fluid of the drilling fluid. In some of these examples, the manganese oxides may be used to form a portion of the filter cake thereby reducing the loss of the drilling fluid to the surrounding formation. The treatment fluid may be added after the drilling fluid to remove the manganese oxides from the wellbore walls and to assist in restoring the formation permeability.

FIG. 1 shows an illustrative schematic of a system that can deliver examples of the treatment fluids to a downhole location. It should be noted that while FIG. 1 generally depicts a land-based system, it is to be recognized that like systems can be operated in subsea locations as well. As depicted in FIG. 1, a system 1 comprises a mixing tank 10, in which the treatment fluids described herein may be formulated. The components of the treatment fluid, for example, the activator, the acid and/or acid-generating agent, and the aqueous base fluid may be combined with one another in any order. Once mixed and prepared, the treatment fluid is then conveyed into the wellbore via pump 20 and a line 12 to the wellhead 14. The pump 20 can be configured to raise the pressure of the treatment fluid to a desired degree before its introduction into the tubular 16. The treatment fluid enters a tubular 16, with the tubular 16 extending from the wellhead 14 into a subterranean formation 18. At a desired location, the treatment fluid is ejected from the tubular 16 to contact and dissolve any manganese oxides present in the wellbore. The treatment fluid may dissolve the manganese oxides without the creation of insoluble byproducts in the treatment fluid. In some examples, these manganese oxides may be a part of the filter cake disposed on the walls of the wellbore. In some optional examples, a heating unit may heat the treatment fluid prior to and/or as it is introduced into the wellbore. The heating unit may be any equipment sufficient for heating the treatment fluid.

It is to be recognized that the system 1 is merely exemplary in nature and various additional components can be present that have not necessarily been depicted in FIG. 1 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
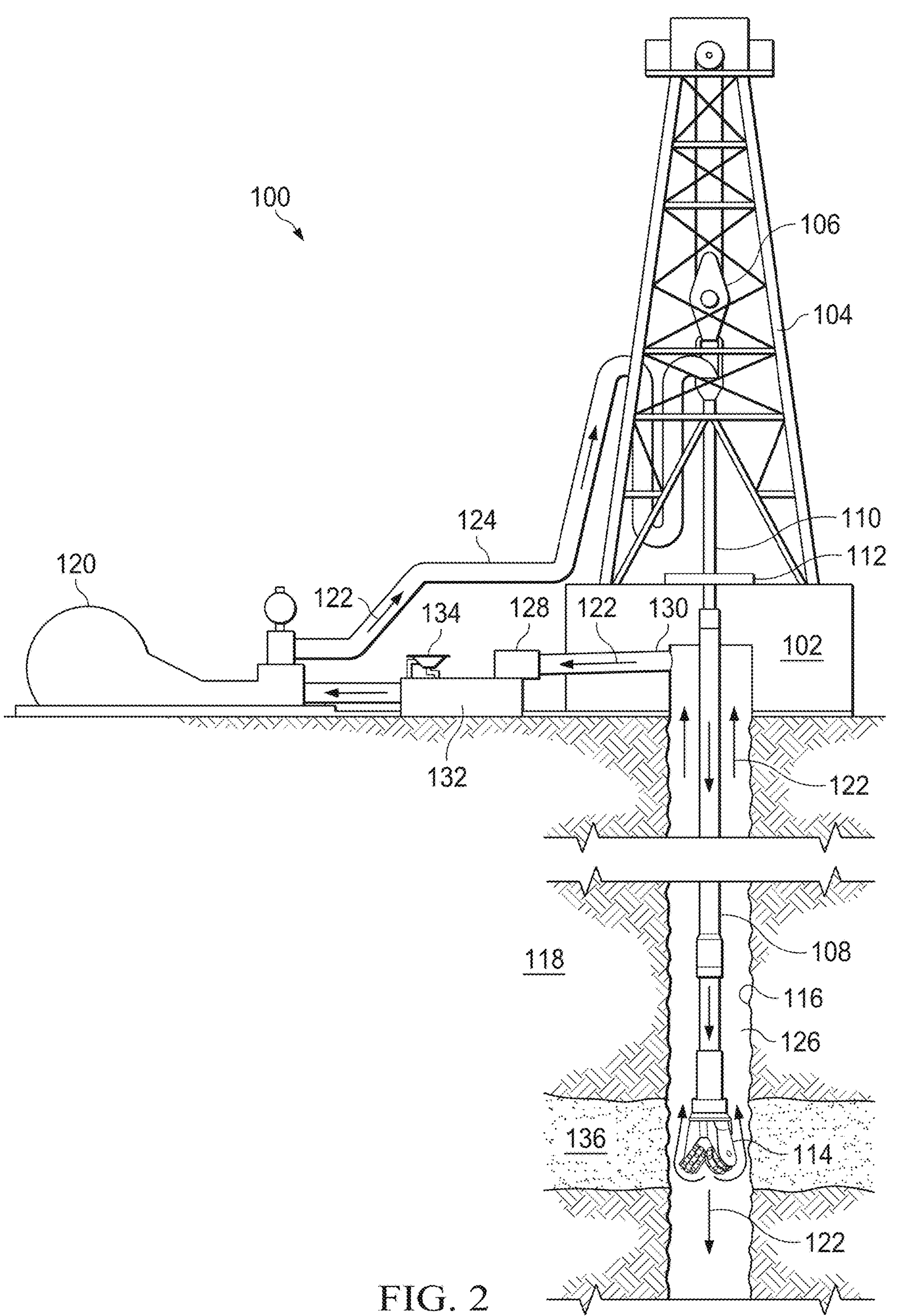
FIG. 2 is an illustrative schematic of a drilling assembly in which a treatment fluid is used in accordance with one or more examples described herein.

FIG. 2 illustrates a schematic for using a treatment fluid 122 while a drilling assembly 100 is still in place in a wellbore 116. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118. In an embodiment, the drill bit 114 penetrates reservoir section 136 while a drilling fluid is circulated in the wellbore 116 during the drilling of the reservoir section 136. In some examples, the drilling fluid may comprise manganese oxides as a weighting agent.

A treatment fluid 122, as described herein is circulated after the circulation of the drilling fluid. The treatment fluid may be used to clean the wellbore 116 by dissolving any manganese oxides in the wellbore 116. A pump 120 (e.g., a mud pump) may circulate the treatment fluid 122 through a feed pipe 124 and to the kelly 110, which conveys the treatment fluid 122 downhole through the interior of the drill string 108 and through one or more orifices in the drill bit 114 and into the wellbore 116 portion penetrating the reservoir section 136. The treatment fluid 122 may then contact the manganese oxides and begin the dissolution process.

The treatment fluid 122 may then be circulated back to the surface via an annulus 126 defined between the drill string 108 and the walls of the wellbore 116. At the surface, the treatment fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the treatment fluid 122.

After passing through the fluid processing unit(s) 128, a "cleaned" treatment fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more treatment fluid additives may be added to the treatment fluid 122 via a mixing hopper 134 communicably coupled to or otherwise in fluid communication with the retention pit 132. In some examples, the treatment fluid additives comprise additional amounts of the treatment fluid components (e.g., the activator, the acid and/or acid-generating agent, the aqueous base fluid, etc.) that may be added to the treatment fluid 122 via the mixing hopper. The mixing hopper 134 may include, but is not limited to, mixers and related mixing equipment known to those skilled in the art. Alternatively, the treatment fluid additives may be added to the treatment fluid 122 at any other location in the drilling assembly 100. While FIG. 2 shows only a single retention pit 132, there could be more than one retention pit 132, such as multiple retention pits 132 in series. Moreover, the retention pit 132 may be representative of one or more fluid storage facilities and/or units where the treatment fluid additives may be stored, reconditioned, and/or regulated until added to the treatment fluid 122.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

To facilitate a better understanding of the present embodiments, the following examples of certain aspects of some embodiments are given. In no way should the following examples be read to limit, or define, the entire scope of the embodiments.

EXAMPLES

An experiment was conducted to compare the effect of different compositions on the dissolution of an oxide mixture. The oxide mixture had a concentration of manganese oxides greater than 90%. Experiment samples 1, 2, 3, and 6 contained ethanolamine, and experiment samples 4, 5, 8, and 10 contained hydroxylammonium chloride. The composition formulations and the calculated percentage dissolution are provided below in Table 1.

TABLE 1

| Dissolution Experiment | | | | | | | | | | | | | |
|---|---|---|---|---|---|---|---|---|---|---|---|---|---|
| Exp. # | 1 | 2 | 3 | 4 | 5 | 6 | 7 | 8 | 9 | 10 | 11 | 12 | 13 |
| Oxide Mixture (g) | 1 | 1.5 | 1.5 | 1.3 | 1 | 1 | 1 | 1 | 1 | 1 | 2 | 2 | 2 |
| % Ethanolamine | 1 | 1 | 5 | | | 1 | | | | | | 3 | |
| % Hydroxylammonium Chloride | | | | 1 | 1 | | | 1 | | 1 | | | |
| % Isopropyl hydroxylamine (v/v) | | | | | | | | | | | | | 3 |
| % Citric Acid | 10 | 10 | 10 | 15 | 15 | 15 | 15 | 15 | 15 | 15 | | | |
| % Acetic Acid (99.5% purity) | | | | 15 | | 15 | | | | | | | |
| % Lactic Acid (90% purity) (g) | | | | | 15 | | | | 15 | 15 | | | |
| % Hydrochloric Acid | 5 | 5 | 5 | | | | | | | | | | |
| % Formic Acid (86% purity) | | | | | | | | | | | 10 | 10 | 10 |
| % Diethylene Glycol Diformate 60-100% | | | | | | | 15 | | | | | | |
| Residue (g) | 0.36 | 0.55 | 0.75 | 0.33 | 0.09 | 0.16 | 0.19 | 0.2 | 0.2 | 0.05 | 1.9 | 0.72 | 0.4 |
| % Dissolution | 64 | 63 | 50 | 74 | 91 | 84 | 81 | 80 | 80 | 95 | 5 | 64 | 80 |
| pH | 1.3 | 1.5 | 3.5 | 1.3 | 1.1 | 1.2 | 1.3 | 1.3 | 1.3 | 1.2 | | | |
| Duration at room temp. (Hrs.) | 3 | 3 | 3 | 1 | 3 | 3 | 3 | 3 | 3 | 3 | 16 | 16 | 16 |

Figure 3:
FIG. 3 is a photograph illustrating a sample of manganese tetroxide treated with acid and an activator in accordance with one or more examples described herein.

FIG. 3 is a photograph illustrating a sample of 1.5 grams of manganese tetroxide in 10% acid and a 3% activator of isopropyl hydroxylamine. The acid used was varied by sample. These photos were taken after treatment for 16 hours.

Figure 4:
FIG. 4 is a photograph illustrating a sample of manganese tetroxide treated with acid without any activator in accordance with one or more examples described herein.

FIG. 4 is a photograph illustrating a sample of 1.5 grams of manganese tetroxide in 10% acid without any activator. The acid used was varied by sample. These photos were taken after treatment for 16 hours. As can be observed, the samples with the activator showed a higher dissolution of the manganese tetroxide.

The treatment fluids disclosed herein may directly or indirectly affect one or more components or pieces of equipment associated with or which may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are treatment fluids for dissolving manganese oxides in accordance with the disclosure and the illustrated FIGs. An example treatment fluid comprises an activator selected from the group consisting of hydroxylamine, isopropyl hydroxylamine, amino alcohols, salts thereof, and combinations thereof. The treatment fluid additionally comprises an acid and/or acid-generating agent, and an aqueous base fluid.

Additionally or alternatively, the treatment fluids may include one or more of the following features individually or in combination. The activator may be present in the treatment fluid in a concentration in a range of about 0.1% w/v to about 40% w/v. The acid may be an organic acid or the acid-generating agent generates an organic acid. The acid may be an inorganic acid or the acid-generating agent generates an inorganic acid. The treatment fluid may comprise an acid selected from the group consisting of formic acid, lactic acid, glycolic acid, hydroxy acids, methane sulfonic acids, citric acid, pyruvic acid, chloroacetic acid, haloacetic acids, methanesulfonic acid, sulfuric acid, ascorbic acid, salt of phosphonic and/or any combination thereof. The treatment fluid may comprise an acid-generating agent selected from the group consisting of esters, acid chlorides, orthoesters, formates, lactides, lactic acid derivatives, carbonates, amino acids, glycolides, ε-caprolactones, hydroxy ester ethers, hydroxybutyrates, anhydrides, phosphazenes, methyl lactate, ethyl lactate, propyl lactate, butyl lactate, formate esters (e.g., ethylene glycol monoformate, ethylene glycol diformate, diethylene glycol diformate, glyceryl monoformate, glyceryl diformate, glyceryl triformate, triethylene glycol diformate and formate esters of pentaerythritol), esters or polyesters of glycerol (e.g., tripropionin (a triester of propionic acid and glycerol), trilactin, etc.) esters of acetic acid and glycerol (e.g., monoacetin, diacetin, and triacetin), sulfonate esters (e.g., methyl p-toluenesulfonate, ethyl p-toluenesulfonate, methyl methanesulfonate, ethyl methanesulfonate, methyl benzenesulfonate, ethyl benzenesulfonate, methyl 2,4,6-trimethylbenzenesulfonate, ethyl 2,4,6-trimethylbenzenesulfonate), aliphatic polyesters, poly (lactides), poly(glycolides), poly(ε-caprolactones), poly(hydroxy ester ethers), poly(hydroxybutyrates), poly(anhydrides), aliphatic polycarbonates, poly(orthoesters), poly (amino acids), poly(ethylene oxides), polyphosphazenes, copolymers thereof, and any combination thereof. The acid or acid-generating agent may be present in the treatment fluid in a concentration in a range of about 1% w/v to about 40% w/v. The treatment fluid may be substantially free of hydrazine and hydrazide.

Provided are methods for dissolving manganese oxides with a treatment fluid in accordance with the disclosure and the illustrated FIGs. An example method comprises providing a treatment fluid comprising an activator selected from the group consisting of hydroxylamine, isopropyl hydroxylamine, ethanolamine, amino alcohols, salts thereof, and combinations thereof; an acid and/or acid-generating agent; and an aqueous base fluid. The method further comprises introducing the treatment fluid into a wellbore and contacting a manganese oxide in the wellbore with the treatment fluid.

Additionally or alternatively, the method may include one or more of the following features individually or in combination. The treatment fluid may be introduced into the wellbore after a drilling fluid was circulated in the wellbore. The drilling fluid may have introduced the manganese oxide into the wellbore. The treatment fluid may be heated with heating equipment prior to and/or as it is introduced into the wellbore. The treatment fluid may not be heated with heating equipment prior to or as it is introduced into the wellbore. The manganese oxide may be a component of a filter cake disposed on a wall of the wellbore. The treatment fluid may dissolve the manganese oxide after contact without generating insoluble byproducts in the treatment fluid. The activator may be present in the treatment fluid in a concentration in a range of about 0.1% w/v to about 40% w/v. The acid may be an organic acid or the acid-generating agent generates an organic acid. The acid may be an inorganic acid or the acid-generating agent generates an inorganic acid. The treatment fluid may comprise an acid selected from the group consisting of formic acid, lactic acid, glycolic acid, hydroxy acids, methane sulfonic acids, citric acid, pyruvic acid, chloroacetic acid, haloacetic acids, methanesulfonic acid, sulfuric acid, ascorbic acid, salt of phosphonic and/or any combination thereof. The treatment fluid may comprise an acid-generating agent selected from the group consisting of esters, acid chlorides, orthoesters, formates, lactides, lactic acid derivatives, carbonates, amino acids, glycolides, ε-caprolactones, hydroxy ester ethers, hydroxybutyrates, anhydrides, phosphazenes, methyl lactate, ethyl lactate, propyl lactate, butyl lactate, formate esters (e.g., ethylene glycol monoformate, ethylene glycol diformate, diethylene glycol diformate, glyceryl monoformate, glyceryl diformate, glyceryl triformate, triethylene glycol diformate and formate esters of pentaerythritol), esters or polyesters of glycerol (e.g., tripropionin (a triester of propionic acid and glycerol), trilactin, etc.) esters of acetic acid and glycerol (e.g., monoacetin, diacetin, and triacetin), sulfonate esters (e.g., methyl p-toluenesulfonate, ethyl p-toluenesulfonate, methyl methanesulfonate, ethyl methanesulfonate, methyl benzenesulfonate, ethyl benzenesulfonate, methyl 2,4,6-trimethylbenzenesulfonate, ethyl 2,4,6-trimethylbenzenesulfonate), aliphatic polyesters, poly(lactides), poly(glycolides), poly(ε-caprolactones), poly(hydroxy ester ethers), poly(hydroxybutyrates), poly(anhydrides), aliphatic polycarbonates, poly (orthoesters), poly(amino acids), poly(ethylene oxides), polyphosphazenes, copolymers thereof, and any combination thereof. The acid or acid-generating agent may be present in the treatment fluid in a concentration in a range of about 1% w/v to about 40% w/v. The treatment fluid may be substantially free of hydrazine and hydrazide.

Provided are systems for dissolving manganese oxides with a treatment fluid in accordance with the disclosure and the illustrated FIGs. An example system comprises a treatment fluid comprising an activator selected from the group consisting of hydroxylamine, isopropyl hydroxylamine, ethanolamine, amino alcohols, salts thereof, and combinations thereof; an acid and/or acid-generating agent; and an aqueous base fluid. The system further comprises mixing equipment configured to mix the activator, the acid and/or acid-generating agent, and the aqueous base fluid; and pumping equipment configured to pump the treatment fluid in the wellbore to contact a manganese oxide in the wellbore.

Additionally or alternatively, the system may include one or more of the following features individually or in combination. The system further comprises a drill string and a drill bit; wherein the treatment fluid is pumped through the drill string and the drill bit. The system further comprises a drilling fluid that introduced the manganese oxide into the wellbore. The treatment fluid may be configured to be introduced into the wellbore after the drilling fluid was circulated in the wellbore. The system further comprises heating equipment configured to heat the treatment fluid prior to and/or as it is introduced into the wellbore. The activator may be present in the treatment fluid in a concentration in a range of about 0.1% w/v to about 40% w/v. The acid may be an organic acid or the acid-generating agent generates an organic acid. The acid may be an inorganic acid or the acid-generating agent generates an inorganic acid. The treatment fluid may comprise an acid selected from the group consisting of formic acid, lactic acid, glycolic acid, hydroxy acids, methane sulfonic acids, citric acid, pyruvic acid, chloroacetic acid, haloacetic acids, methanesulfonic acid, sulfuric acid, ascorbic acid, salt of phosphonic and/or any combination thereof. The treatment fluid may comprise an acid-generating agent selected from the group consisting of esters, acid chlorides, orthoesters, formates, lactides, lactic acid derivatives, carbonates, amino acids, glycolides, ε-caprolactones, hydroxy ester ethers, hydroxybutyrates, anhydrides, phosphazenes, methyl lactate, ethyl lactate, propyl lactate, butyl lactate, formate esters (e.g., ethylene glycol monoformate, ethylene glycol diformate, diethylene glycol diformate, glyceryl monoformate, glyceryl diformate, glyceryl triformate, triethylene glycol diformate and formate esters of pentaerythritol), esters or polyesters of glycerol (e.g., tripropionin (a triester of propionic acid and glycerol), trilactin, etc.) esters of acetic acid and glycerol (e.g., monoacetin, diacetin, and triacetin), sulfonate esters (e.g., methyl p-toluenesulfonate, ethyl p-toluenesulfonate, methyl methanesulfonate, ethyl methanesulfonate, methyl benzenesulfonate, ethyl benzenesulfonate, methyl 2,4,6-trimethylbenzenesulfonate, ethyl 2,4,6-trimethylbenzenesulfonate), aliphatic polyesters, poly(lactides), poly(glycolides), poly(ε-caprolactones), poly(hydroxy ester ethers), poly(hydroxybutyrates), poly(anhydrides), aliphatic polycarbonates, poly (orthoesters), poly(amino acids), poly(ethylene oxides), polyphosphazenes, copolymers thereof, and any combination thereof. The acid or acid-generating agent may be present in the treatment fluid in a concentration in a range of about 1% w/v to about 40% w/v. The treatment fluid may be substantially free of hydrazine and hydrazide.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for dissolving manganese oxides, the method comprises:

providing a treatment fluid comprising:

an activator selected from the group consisting of hydroxylamine, isopropyl hydroxylamine, ethanolamine, amino alcohols, salts thereof, and combinations thereof, an acid and/or acid-generating agent, and an aqueous base fluid;

introducing the treatment fluid into a wellbore; and contacting a manganese oxide in the wellbore with the treatment fluid.

2. The method of claim 1, wherein the treatment fluid is introduced into the wellbore after a drilling fluid was circulated in the wellbore.

3. The method of claim 2, wherein the drilling fluid introduced the manganese oxide into the wellbore.

4. The method of claim 1, wherein the treatment fluid is heated with heating equipment prior to and/or as it is introduced into the wellbore.

5. The method of claim 1, wherein the treatment fluid is not heated with heating equipment prior to or as it is introduced into the wellbore.

6. The method of claim 1, wherein the manganese oxide is a component of a filter cake disposed on a wall of the wellbore.

7. The method of claim 1, wherein the treatment fluid dissolves the manganese oxide after contact without generating insoluble byproducts in the treatment fluid.

* * * * *